(12) United States Patent
Bellis et al.

(10) Patent No.: US 9,527,450 B1
(45) Date of Patent: Dec. 27, 2016

(54) INTEGRATED VEHICLE-END STRUCTURE

(71) Applicant: Tesla Motors, Inc., Palo Alto, CA (US)

(72) Inventors: James Bellis, Sunnyvale, CA (US); P Thomas Vikstrom, Los Altos, CA (US)

(73) Assignee: TESLA MOTORS, INC., Palo Alto, CA (US)

( * ) Notice: Subject to any disclaimer, the term of this patent is extended or adjusted under 35 U.S.C. 154(b) by 0 days.

(21) Appl. No.: 14/839,822

(22) Filed: Aug. 28, 2015

(51) Int. Cl.
*B60R 11/06* (2006.01)
*B60R 5/04* (2006.01)
*B62D 65/02* (2006.01)

(52) U.S. Cl.
CPC ............... *B60R 5/04* (2013.01); *B62D 65/024* (2013.01)

(58) Field of Classification Search
CPC .... F16H 61/32; F16H 2061/326; F16H 59/08; Y10T 74/19251; B01D 63/10; B60K 37/02; B60R 11/0252; B60R 16/0315; B60R 1/07; B60T 13/406
USPC .............................. 296/37.1, 193.04, 203.02, 187.09, 296/187.11, 193.08, 193.09, 203.04; 307/10.1
See application file for complete search history.

(56) References Cited

U.S. PATENT DOCUMENTS

| | | | | |
|---|---|---|---|---|
| 6,733,060 B1* | 5/2004 | Pavkov | ...................... | B60R 5/04 108/110 |
| 6,811,196 B2* | 11/2004 | Gammon | ................... | B60R 5/04 296/37.1 |
| 7,040,691 B1* | 5/2006 | Jacobs | ................... | B62D 29/001 296/193.07 |
| 7,201,421 B2* | 4/2007 | Reynolds | .................. | B60R 7/02 224/400 |
| 8,282,146 B2* | 10/2012 | Izutsu | .................. | B62D 25/087 296/187.11 |
| 8,814,245 B1* | 8/2014 | Welch | ....................... | B60R 7/02 296/37.16 |
| 9,073,488 B1* | 7/2015 | Stanczak | ................. | B60R 5/045 |
| 9,440,590 B1* | 9/2016 | Huelke | ...................... | B60R 7/04 |
| 2004/0066061 A1* | 4/2004 | Engels | ..................... | B60R 19/18 296/193.08 |
| 2007/0085381 A1* | 4/2007 | Delaney | ................. | B62D 25/04 296/193.08 |
| 2011/0101721 A1* | 5/2011 | Sogame | .................. | B60R 5/045 296/37.1 |
| 2011/0101736 A1* | 5/2011 | Sogame | ............... | B62D 25/087 296/203.04 |
| 2011/0227367 A1* | 9/2011 | Funakoshi | ........... | B62D 25/087 296/187.11 |
| 2012/0187719 A1* | 7/2012 | Fujii | ..................... | B62D 25/082 296/187.09 |
| 2012/0212013 A1* | 8/2012 | Ripley | ..................... | B62J 25/00 297/195.13 |
| 2014/0054928 A1* | 2/2014 | Narahara | ........... | B62D 25/2027 296/193.08 |

(Continued)

*Primary Examiner* — Kiran B Patel
(74) *Attorney, Agent, or Firm* — Garlick & Markison; Bruce E. Garlick

(57) ABSTRACT

An integrated end structure for a vehicle comprises: a storage compartment module that comprises a shell forming a storage compartment therein, the storage compartment module configured to sit onto a frame rail of the vehicle; and a vehicle end module configured to be mounted onto a bracket in the vehicle that provides adjustability of the vehicle end module in a z-direction, the vehicle end module configured for holding a light unit of the vehicle. The storage compartment module is mounted onto the vehicle end module.

8 Claims, 9 Drawing Sheets

(56) References Cited

U.S. PATENT DOCUMENTS

| | | | |
|---|---|---|---|
| 2014/0070566 A1* | 3/2014 | Ogawa | B62D 25/087 296/187.11 |
| 2014/0300127 A1* | 10/2014 | Kawano | B60R 13/011 296/37.1 |
| 2014/0300135 A1* | 10/2014 | Roehrl | B62D 21/152 296/187.09 |

* cited by examiner

INTEGRATED VEHICLE-END STRUCTURE

BACKGROUND

Vehicle assembly in manufacturing plants is a complex operation that involves many thousands of components that must be brought together in a specific order to effectively, yet precisely and accurately, produce many vehicles of a given type. The quality of the resulting vehicle is primarily judged in terms of its safety and suitability for its intended purpose. However, other characteristics are also considered, such as the fit between body panels, whether decorative elements are level, whether the headlights or taillights are properly aligned or askew, and other elements of visual appearance. These and other aspects are sometimes referred to as the craftsmanship of the vehicle.

SUMMARY

In a first aspect, an integrated end structure for a vehicle comprises: a storage compartment module that comprises a shell forming a storage compartment therein, the storage compartment module configured to sit onto a frame rail of the vehicle; and a vehicle end module configured to be mounted onto a bracket in the vehicle that provides adjustability of the vehicle end module in a z-direction, the vehicle end module configured for holding a light unit of the vehicle; wherein the storage compartment module is mounted onto the vehicle end module.

Implementations can include any or all of the following features. The integrated end structure is an integrated front end structure, and wherein the light unit is a front headlamp. The vehicle end module comprises a left headlamp bracket mounted on one side of a center module, and a right headlamp bracket mounted on an opposite side of the center module. The vehicle end module further comprises an attachment for a hood latch of the vehicle. The storage compartment module and the vehicle end module are made from at least two different composites. The vehicle end module is at least partly hollow and the storage compartment extends into the vehicle end module. The bracket is part of a bumper beam attachment in the vehicle.

In a second aspect, an integrated end structure for a vehicle comprises: a storage compartment module that comprises a shell forming a storage compartment therein, the storage compartment module configured to sit onto a frame rail of the vehicle; and means for i) taking load carrying capability from the storage compartment module, ii) holding a light unit of the vehicle, and iii) setting at least an x-direction position of the integrated end structure, the means configured to be mounted onto a bracket in the vehicle that provides adjustability of the means in a z-direction; wherein the storage compartment module is mounted onto the means.

In a third aspect, a method comprises: placing a center module for an integrated end structure for a vehicle in a fixture separate from the vehicle; attaching at least one side bracket to the center module in the fixture to form an assembly, the side bracket configured for holding a light unit of the vehicle; mounting the assembly onto at least a bracket in the vehicle that provides adjustability of the assembly in a z-direction; and after mounting the assembly, mounting a storage compartment module onto the center module and the side bracket.

Implementations can include any or all of the following features. Placing the center module and attaching the side bracket take place offline an assembly line, the method further comprising bringing the assembly to the assembly line, wherein mounting the assembly and mounting the storage compartment module take place on the assembly line. Mounting the assembly onto the bracket comprises picking up the assembly using at least x-direction datums on the center module. Placing the center module comprises setting at least an x-direction position for the integrated end structure. Attaching the side bracket comprises setting at least an x-direction position for the side bracket. The method further comprises adjusting the side bracket relative to the center module in at least an x-direction to adjust a position of the light unit. The method further comprises attaching the light unit to the side bracket before mounting the storage compartment module. The method further comprises attaching fascia to the assembly before mounting the storage compartment module. Mounting the storage compartment module comprises attaching the storage compartment module by a fastener to a flange of the center module that sets at least an x-direction position of the integrated end structure. The method further comprises adjusting at least a z-direction position of the integrated end structure by changing a z-direction position of the bracket.

DETAILED DESCRIPTION

This document describes examples of systems and techniques for providing an integrated end structure in a vehicle. Such a structure can allow individual components to share load carrying capability with each other. As another example, it can provide flexibility in adjusting the position of the end structure during assembly, or in particular, flexibility in adjusting the position of vital exterior-facing components (e.g., headlights). In some implementations, the integrated end structure is made from one or more vehicle end modules that form an arcuate shape so as to allow a voluminous component (e.g., a trunk) to later be mounted inside the arced space and thereby complete the entire assembly at that end of the vehicle. For example, this can provide a structural load-sharing assembly at the vehicle end. The vehicle end module can be made from respective components that are precision fitted together to ensure the positioning of components attached to the vehicle end module.

A vehicle front end is described as an illustrative example. However, the term vehicle end is used broadly herein so as to include both the front end and the rear end of a vehicle. Also, some of the examples mention a trunk, and it is contemplated that the vehicle can have a trunk in the front and/or the rear. Finally, the present description makes no particular assumption of where the vehicle's motor(s)—such as electric or combustion motor(s)—should be located. The vehicle can have a single motor located in the rear, or a single motor located in the front, or at least two separate motors, to name just some examples.

Figure 1:
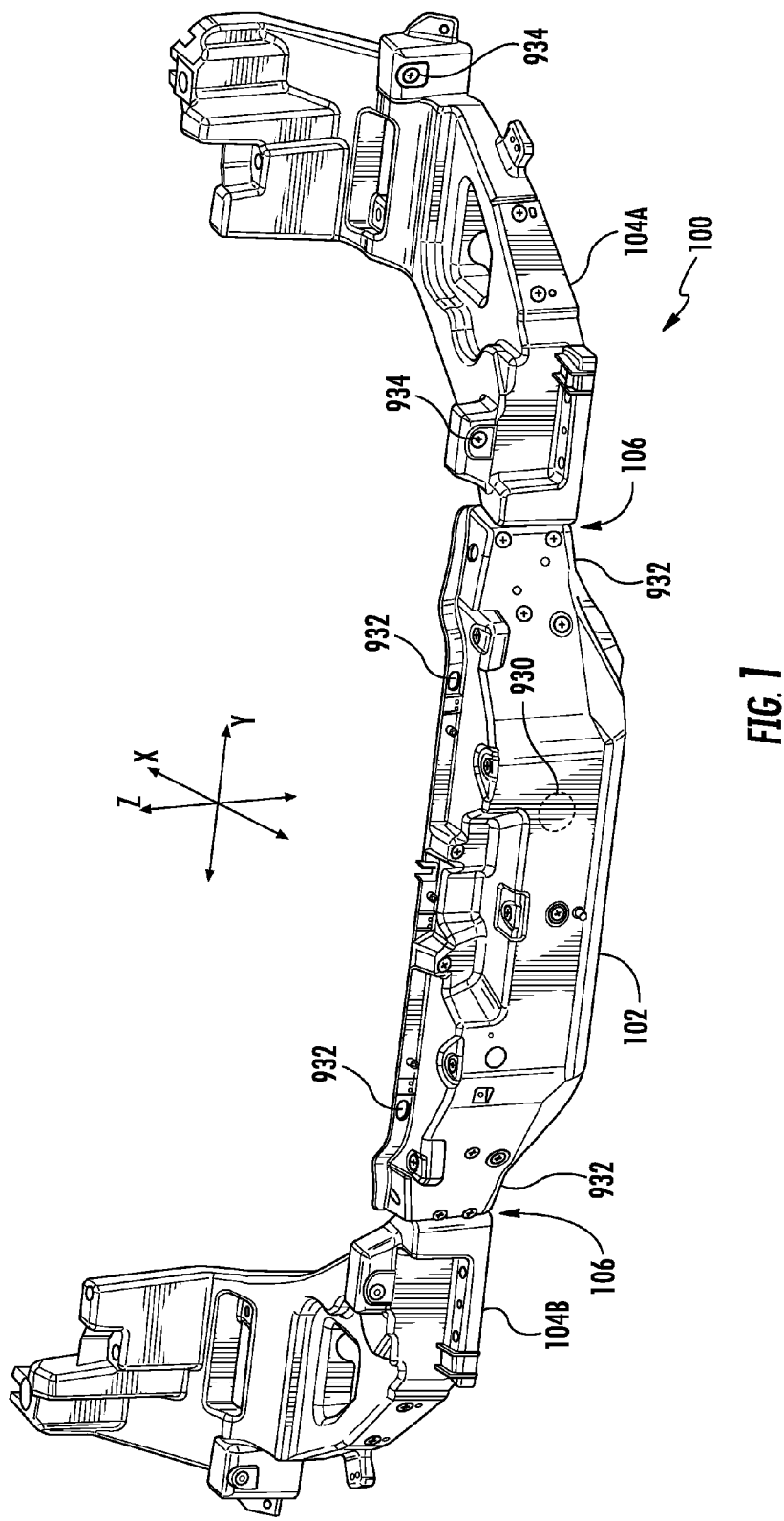
FIG. 1 shows an example of a front end module.

FIG. 1 shows an example of a front end module 100. The module here is made up of three separate parts: a center module 102 and respective side brackets 104A-B. In other implementations, the front end module 100 can be a single component.

The center module is here adapted to be placed centrally at the vehicle front end and be mounted onto a bracket that provides up/down adjustability of the front end module, such as a bumper beam attachment of the vehicle. The side brackets can be adapted for holding vehicle headlamp assemblies or other light units and for being attached to at least the center module and the bracket. For example, fasteners (not shown) attach these components to each other at locations 106.

Other aspects of the figure will be described below with regard to an assembly process.

Figure 2:
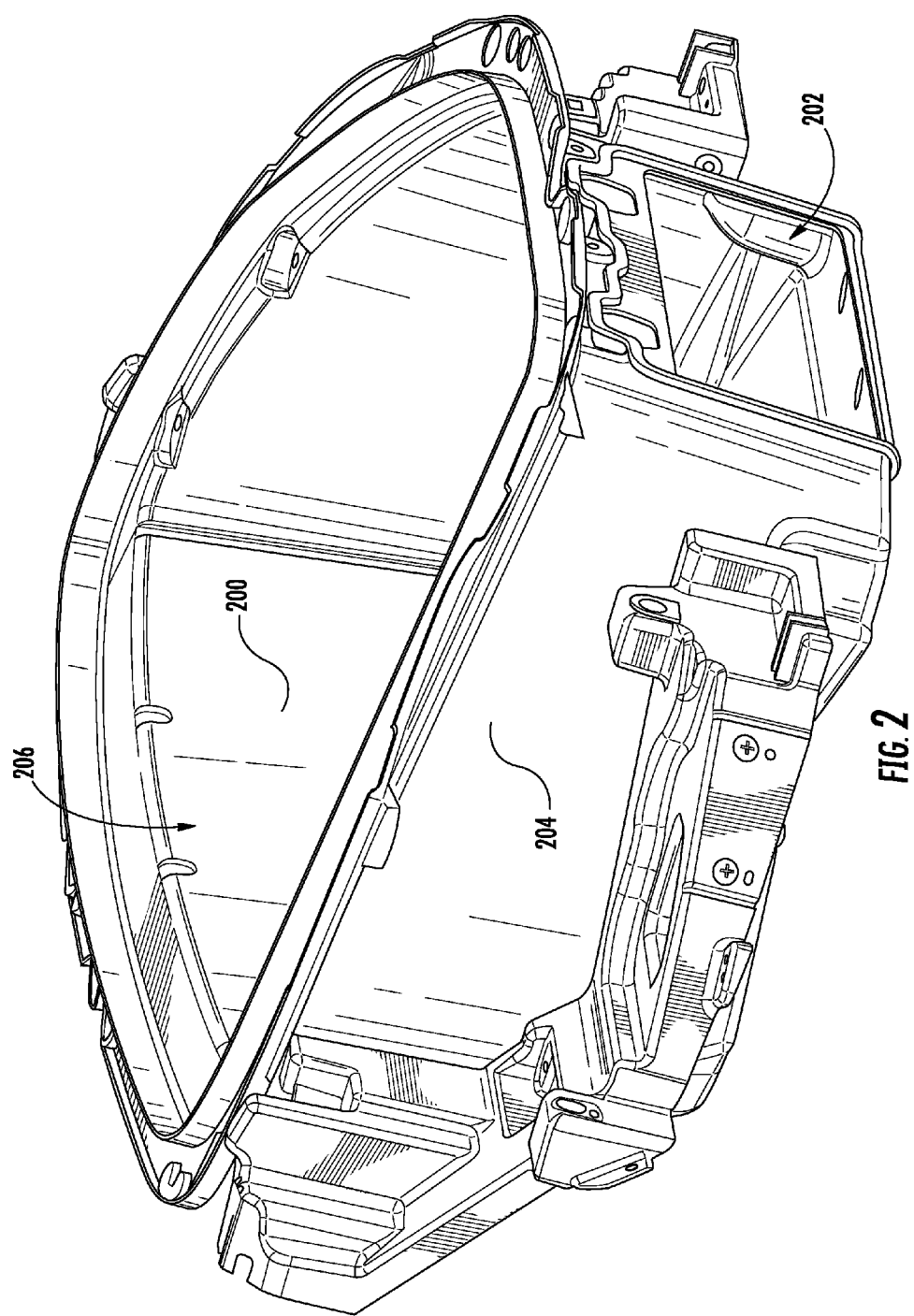
FIG. 2 shows an example of the headlamp brackets attached to a trunk.

FIG. 2 shows an example of the headlamp brackets attached to a trunk 200. This view that omits the center module 102 (FIG. 1) is provided for illustrative purposes. Namely, in some implementations, the side brackets are attached to the center module before the trunk is mounted onto that assembly. In other words, this view does not necessarily show the assembly as it appears during any stage of a manufacturing process. Nevertheless, the current view shows how the side brackets can be positioned adjacent the trunk, and also that the trunk can have an opening 202. For example, when the center module is at least partially hollow, the opening can provide additional storage space for the trunk. That is, the trunk is here a separate module that is in a sense shaped like a tub; for example, the trunk can be made from a shell 204 of any suitable shape that is formed so as to create a storage compartment 206 therein. A trunk is not the only type of structure contemplated, however; another type of storage compartment module for a vehicle can be used.

The trunk and the vehicle end module (e.g., the side brackets and center module) can be made from a suitable material. In some implementations, one or more types of composite materials can be used. For example, the side brackets and/or the trunk can be made of polypropylene, optionally with a reinforcing material such as glass fiber. As another example, the center module can be made of a thermosetting material, optionally with a reinforcing material such as glass fiber. In implementations where the end module is a single component, it can be made of (optionally reinforced) polypropylene or a thermosetting material, to name just two examples.

Figure 3:
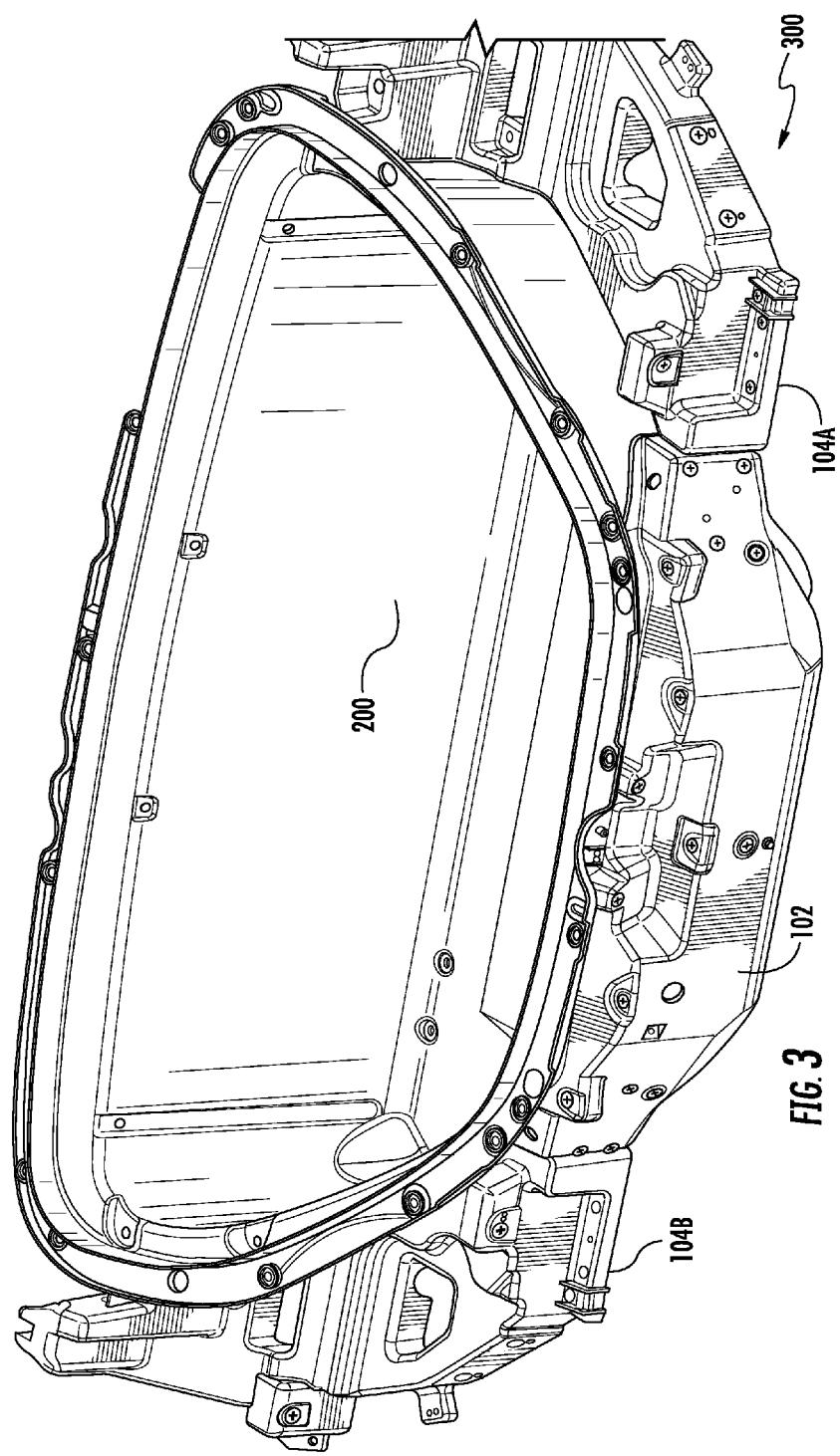
FIG. 3 shows an example of an integrated vehicle end structure.

FIG. 3 shows an example of an integrated vehicle end structure 300. Here, the integrated vehicle end structure is an integrated vehicle front end that includes the center module 102, the side brackets 104A-B and the trunk 200. That is, these components are here shown attached to each other to form an entire assembly. In some implementations, the structure 300 is not built separately but rather is formed when the respective elements are mounted onto a vehicle frame during the manufacturing process.

The integrated nature of the assembly can provide useful advantages. In some implementations, bolting (or otherwise fastening) these four pieces together can create a strong structure at the vehicle end. For example, this assembly can define the complete structure of the vehicle at that end in a way that load paths exist through all the components. Each of the components can take load carrying capability from each of the other ones. For example, the center module can take load carrying capability from the trunk module. As another example, the load carrying capability of the trunk can be improved by some or all of the other pieces. In some implementations, the integrated vehicle end reduces mass of the vehicle structure compared to other approaches.

Figure 4:
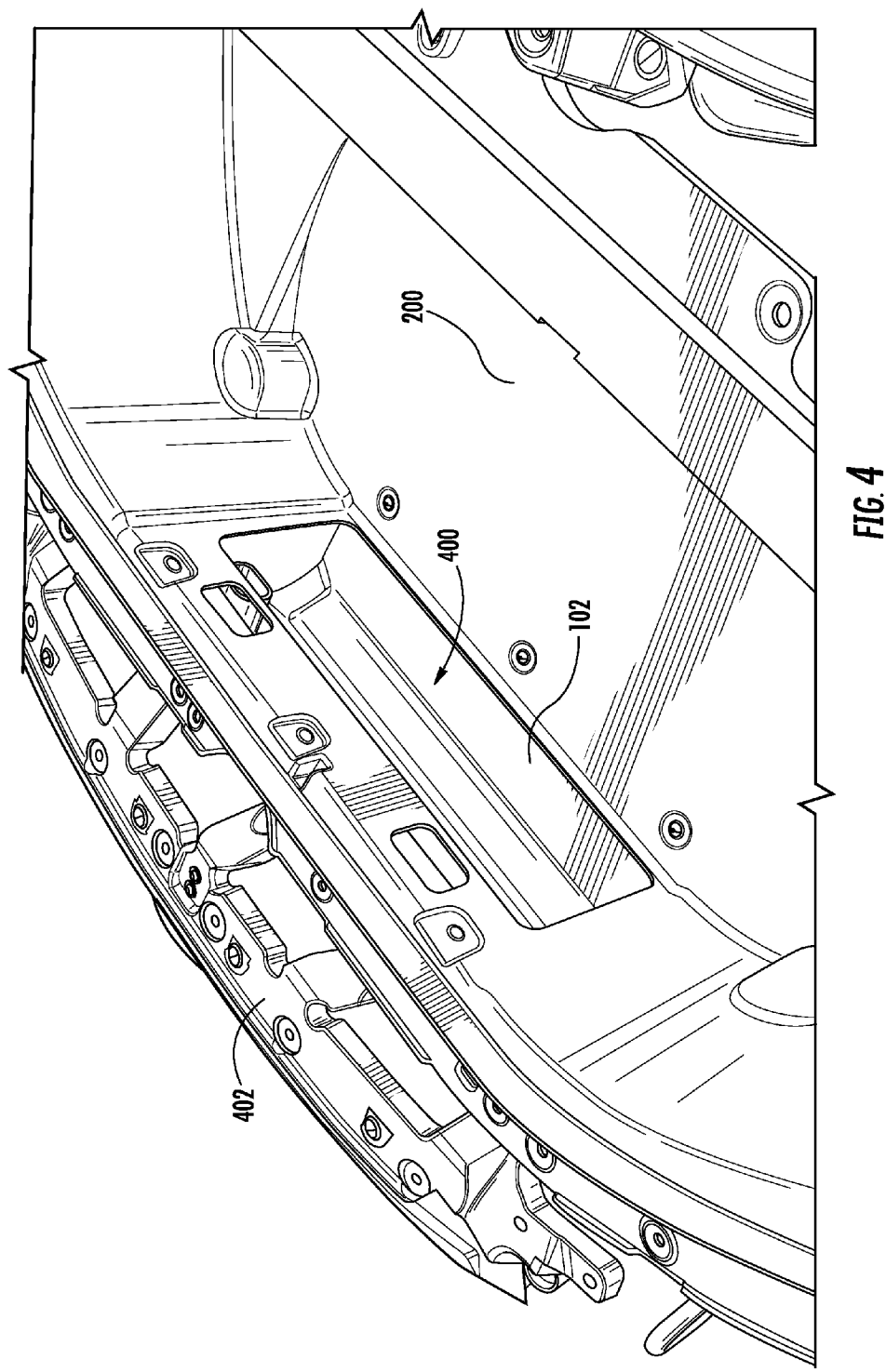
FIG. 4 shows an example of an extended storage compartment area.

FIG. 4 shows an example of an extended storage compartment area 400. This example shows part of the inside of the trunk 200, wherein the area 400 is formed inside the center module 102, which here is hollow, attached to the trunk. For example, the area 400 adds volume of storage space to the trunk beyond its original size, and can accommodate items that would otherwise be too long to fit inside. That is, the storage compartment of the trunk here extends into the center module.

This illustration also shows that the center module 102 can be used to attach other structure 402. For example, fascia for the front (or rear) of the vehicle and/or other components can hang from the center module. This can provide advantages from the points of view of craftsmanship and manufacturing flexibility, as will be described later.

Figure 5:
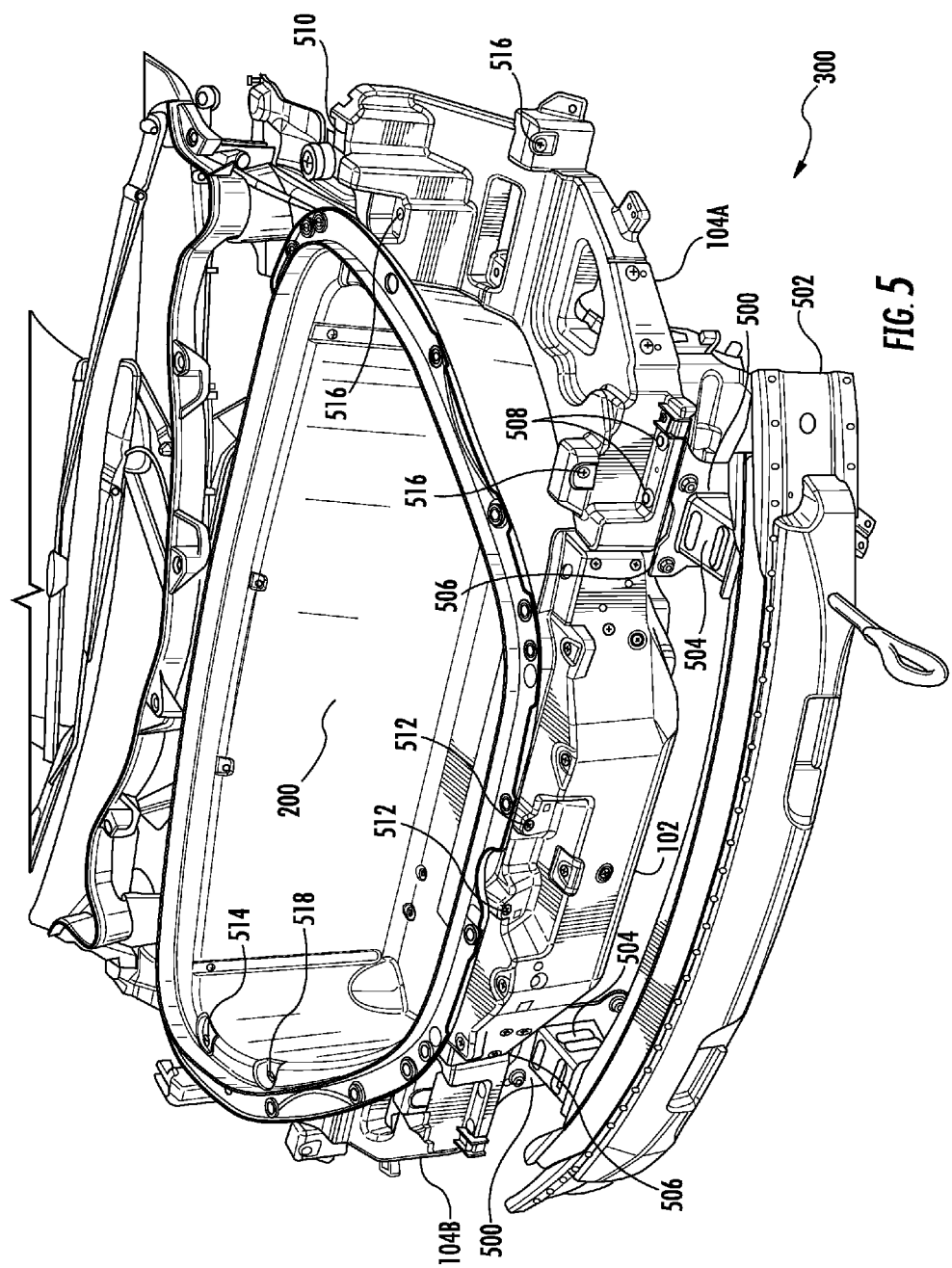
FIG. 5 shows an example of the integrated vehicle end structure mounted onto bumper beam attachments.

FIG. 5 shows an example of the integrated vehicle end structure 300 mounted onto bumper beam attachments 500. Here, the bumper beam attachments serve as the point of attachment to the vehicle for a bumper beam 502. This creates a z-datum for the vehicle end structure so that its position in an up/down direction can be controlled. For example, this can achieve fore/aft slip to accommodate build variation and float of the vehicle end structure and the truck, while allowing the vehicle end to be built according to nominal specifications. In other implementations, the vehicle end structure 300 can be mounted onto another bracket that provides adjustability in an up/down direction.

In this example, crush cans 504 connect the bumper beam to the respective bumper beam attachment. That is, the bumper beam attachment connects the bumper beam to the vehicle frame (here located rearward of the bumper beam attachments) to absorb crash loads in an accident.

In some implementations, each bumper beam attachment has a flange 506 at its upper end on which the center module 102 and/or the side brackets 104A-B can be mounted. For example, the flange can provide an essentially horizontal surface. Each of the side brackets can be mounted onto the bumper beam attachment using two bolts 508 or any other type of fastener; the center module can be mounted using one or more fasteners (not shown) on each of its sides.

The side brackets 104A-B can attach to the vehicle body in one or more other areas. In some implementations, such attachment(s) can be positioned further inward on the vehicle (here, further back). For example, at least one attachment point 510 can be used where a part of the vehicle body (not shown) comes forth. That is, all components of the integrated vehicle end structure 300 rest on top of the bumper beam attachment. This too can provide advantages from the points of view of craftsmanship and manufacturing flexibility.

As a particular example, the hood of a vehicle must usually attach to a structural vehicle member to ensure that it does not inadvertently become unlatched. For instance, the load requirement for the hood latch can be several thousand Newton. The hood latch assembly therefore drives significant structural requirements for the vehicle end assembly. Here, the center member 102 can serve as an attachment for a hood latch (not shown) to provide such a structural member for the hood. For example, one or more attachment points 512 on the center module can be used for mounting the hood latch.

Because the vehicle end module is attached to the trunk, it can better withstand forces applied to the hood. That is, assuming that the trunk is a very rigid part relatively speaking, this arrangement helps shed a portion of the hood latch load into it, for example in the event of a crash. The load is also transferred into the bumper beam attachment or other bracket where the vehicle end module is mounted. The structural assembly formed by the vehicle end module and the trunk can also provide other advantages, such as improved NVH (noise, vibration, harshness) characteristics for headlamp units.

The side brackets 104A-B in turn, can attach to the trunk 200 in one or more places. For example, one or more attachment points 514 on each side of the trunk can be used for that respective side bracket. In some implementations, the side bracket is configured to have a lamp assembly (e.g., for headlights or taillights) mounted on it. For example, one or more attachment points 516 on each bracket can be used by the respective headlamp. The lamp assembly can also or instead be attached to the trunk in one or more places. For example, one or more attachment points 518 on each side of the trunk can be used by a headlamp on that respective side.

Figure 6:
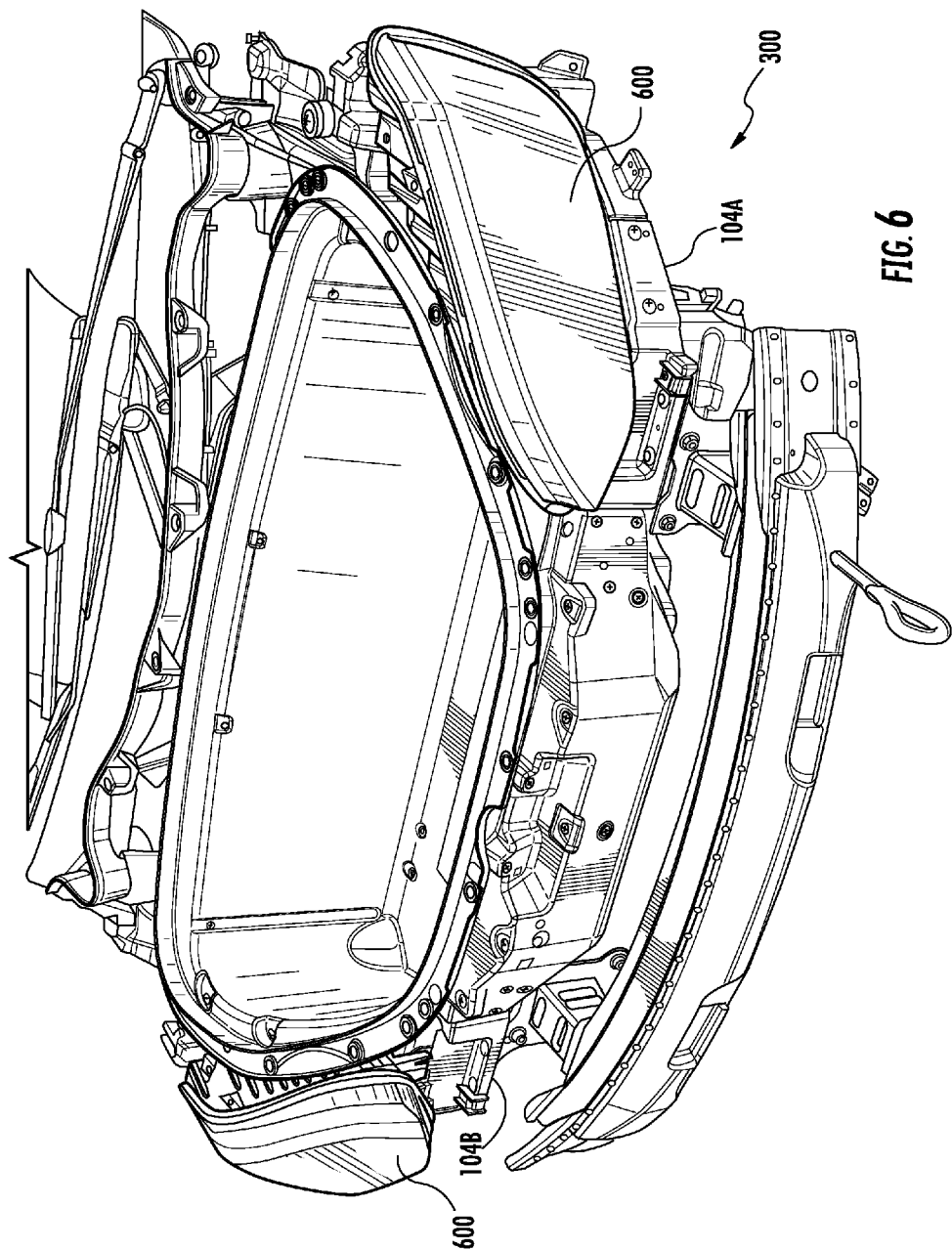
FIG. 6 shows an example of headlight assemblies mounted onto the integrated vehicle end structure.

FIG. 6 shows an example of headlight assemblies 600 mounted onto the integrated vehicle end structure 300. That is, each headlamp assembly is attached to a respective one of the side brackets 104A-B. For example, lamp assemblies (whether front or rear) can be significant for vehicle appearance and it can therefore be important to ensure that they are positioned correctly. Examples described herein of integrated modular structures holding such lamp assemblies provide useful flexibility and convenience when installing headlamps (or other components) during manufacture.

Figure 7:
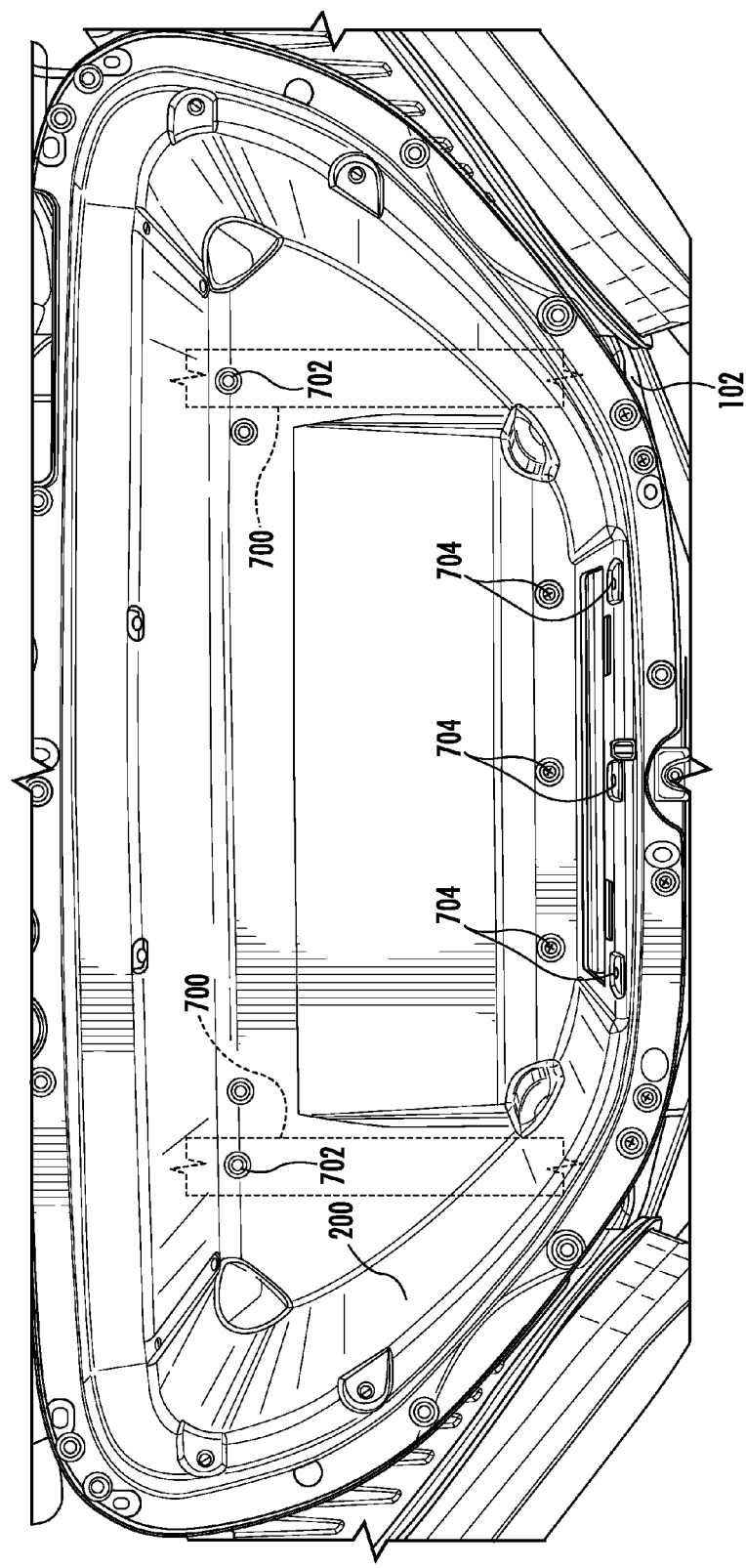
FIG. 7 shows an example of attachment points for the trunk.

FIG. 7 shows an example of attachment points for the trunk 200. The trunk module sits on top of the vehicle body. In some implementations, the vehicle frame includes frame rails 700 underneath the trunk. For example, the bumper beam attachments (not shown) can be mounted at the end of each such respective frame rail. Attachment points 702 at the bottom of the trunk can be the only attachment between the trunk and the respective rails.

The center module 102, moreover, can attach to the trunk in one or more places. In some implementations, the attachments can be made through the side wall and/or a bottom of the trunk. For example, six attachment points 704 can be used.

Figure 8:
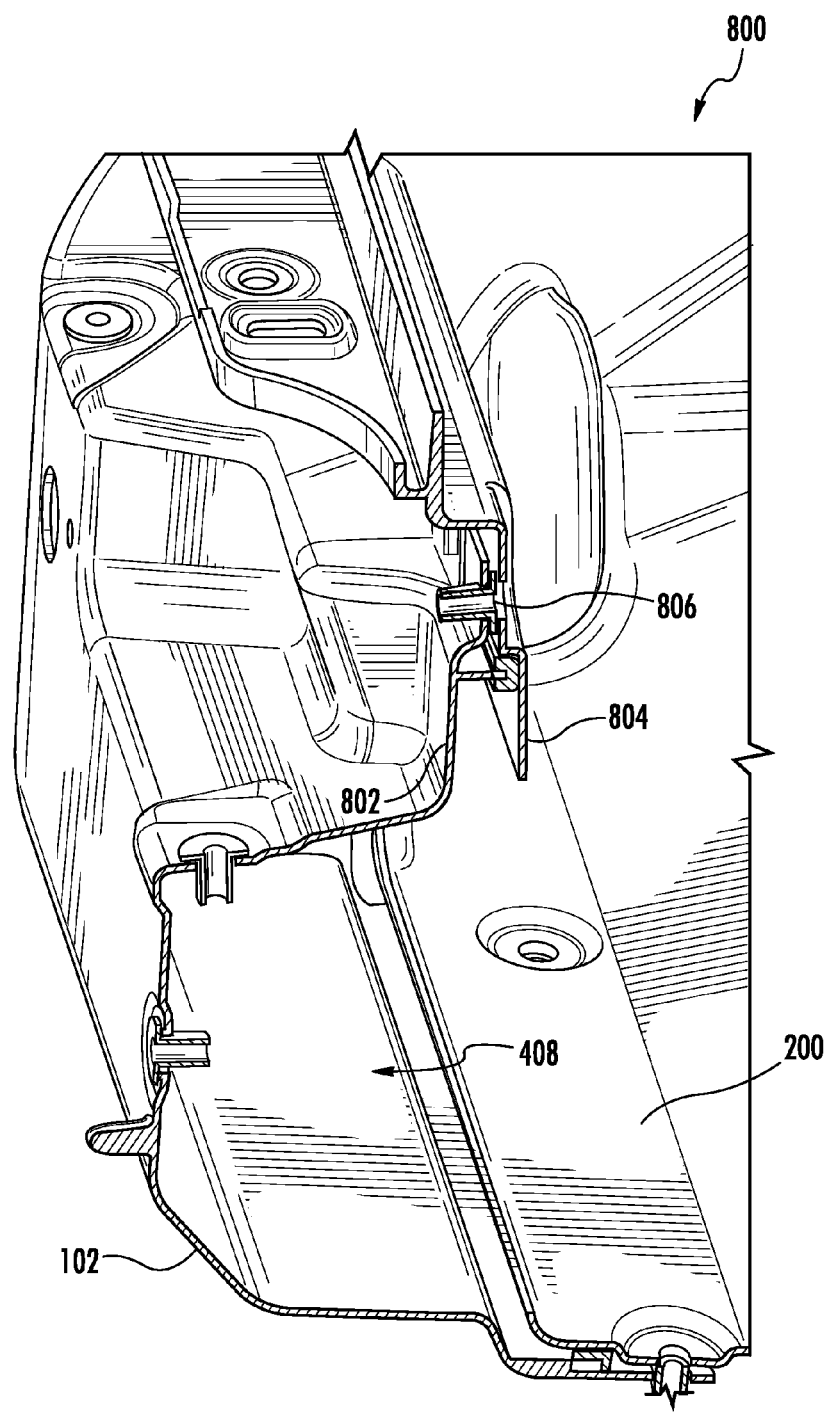
FIG. 8 shows a cross section of the center module and the trunk.

FIG. 8 shows a cross section of the center module 102 and the trunk 200. The center module has a recessed portion 802 that meets with a wall 804 of the trunk. In some implementations, the wall 804 is on the portion of the trunk that faces the vehicle end (here, forward in the vehicle). For example, the wall 804 can be part of structure that defines the opening 400 in the trunk.

One or more attachment points 806 between the center module and the trunk can be defined. In some implementations, attachment point(s) can be above an opening between these components. On the center module, the attachment(s) can be located on a flange that serves to correctly position the trunk in one or more directions based on the positioning of the center module.

Figure 9:
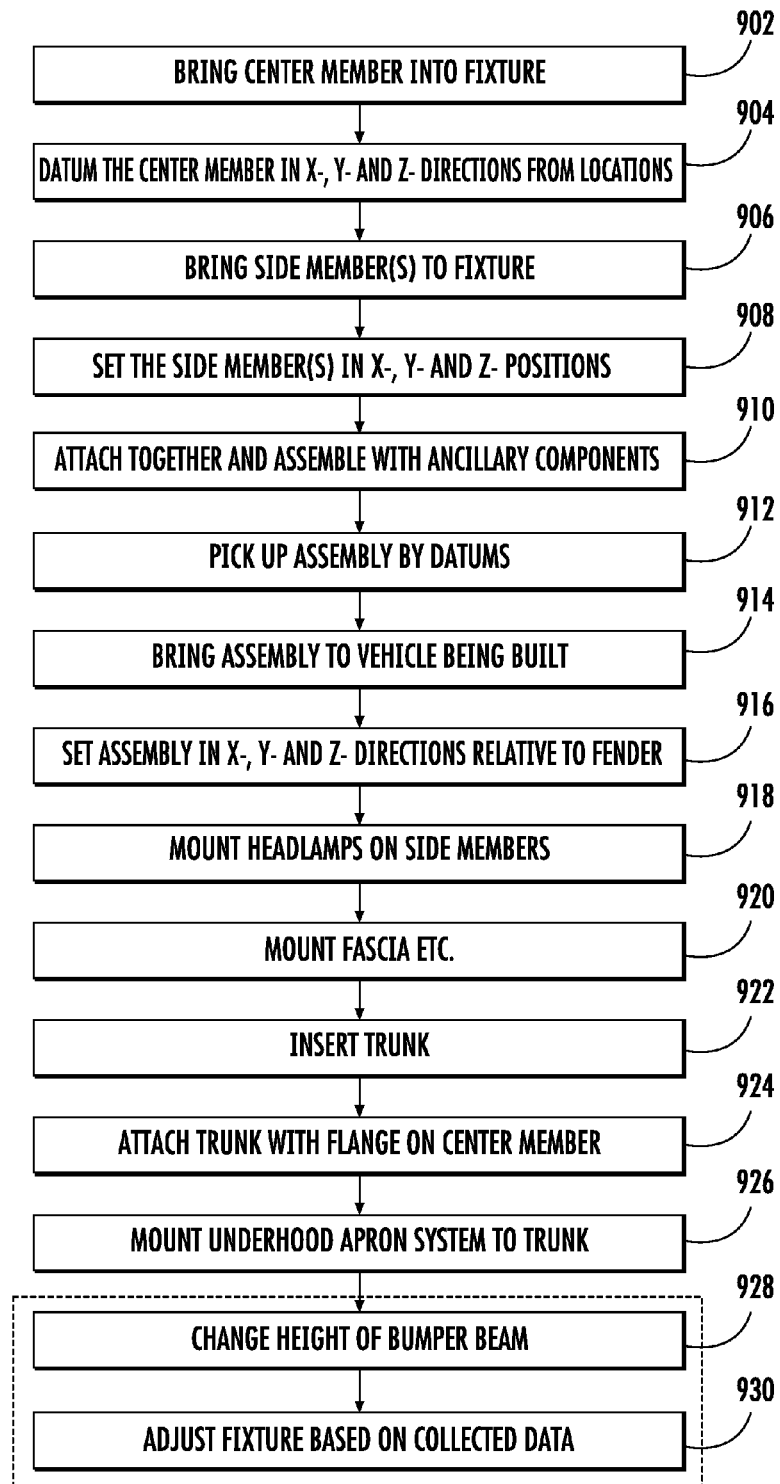
FIG. 9 shows an example of a manufacturing process for an integrated vehicle end structure.

FIG. 9 shows an example of a manufacturing process 900 for an integrated vehicle end structure. The method will be illustrated with reference to examples described herein where the end structure is made from separate modules; however, some parts of the method can also or instead be performed with other structures, such as a non-modular vehicle end structure. Some aspects of FIG. 1 will also be referenced in the following.

At 902, a center member is brought into a fixture. In some implementations, this takes place on the side of a manufacturing line where vehicles are being made. That is, some of the steps in the method can be performed "on the bench" in that the fixture is situated at a separate location from the vehicle where the assembled components are to be installed. For example, the fixture can be a structure having precisely defined datum points at certain spatial locations relative to each other so as to allow an exact assemblage of modular components into one integrated unit that meets dimensional requirements specific to the vehicle. The center module can be clamped into the fixture at one or more suitable positions of the module. For example, the module can be clamped to the fixture approximately at position 930.

At 904, the center module is datumed in x-, y- and z-directions from certain locations on the fixture. Directions can be defined relative to the vehicle body in any suitable way. As used herein (see, e.g., FIG. 1), an x-direction corresponds to the fore/aft position relative to the vehicle, a y-direction corresponds to a cross-vehicle position, and a z-direction corresponds to an up/down position. Accordingly, any position relative to the vehicle being assembled can be specified using particular (x,y,z) coordinates. With this center module, for example, the x-direction—that is, how much fore or aft of a predefined reference point the module is located—is being controlled on the fixture. For example, the clamping can ensure that the module is correctly positioned in the x-, y- and z-directions.

Any suitable locations on the center module can be used for datuming the module. In some implementations, positions both toward the top and toward the bottom of the module can be used. For example, points 932 on a flange of the center module can be used. One or more of the datuming points can be chosen based on an intended point of attachment or contact between the center module and another component (e.g., the trunk).

At 906, the side brackets are brought into the fixture. The side brackets can be datumed in one or more directions using the fixture. In some implementations, the side bracket is datumed only at one or more locations that serve as attachment points for an external component (e.g., a light unit). For example, at 908 the side brackets can be datumed in the x-, y- and z-directions using points 934 on each respective side bracket. At 910, the members are attached together, and can then be assembled together with one or more ancillary components.

The fixture allows the datum points of the side bracket—which in this example are the headlamp attachment points that require careful positioning in the vehicle assembly—to be exactly placed relative to the flange of the center module. This approach provides a way to accommodate size variations resulting from when these components were made, such as by a molding process, by only setting the mounting points for the important component, in this case the headlamp. In other words, craftsmanship depends on how the headlamp fits in the vehicle relative to its fender, to the fascia and to the hood, to name some examples, and the use of an integrated vehicle end structure built of modular parts allows attachment points for significant components to be positioned (e.g., in the x-direction) relative to a common reference. That is, here the attachment points 934 for the headlamp become accurately set in at least the x-direction relative to the flange of the center component 102. The side brackets and the center module are attached to each other using any kind of fastener, such as several bolts on each side.

At 912, the assembly is picked up from the fixture. In some implementations, an assembly aide picks up the assembly using some or all of the datum points. For example, the topmost two of the points 932 can be used. This can ensure that the correct positioning (e.g., in the fore/aft direction) will be preserved. At 914, the assembly is brought to the vehicle being built. In implementations where the vehicle end module is a single piece, operations 902 through 910 can be omitted.

At 916, the assembly is set in at least one direction relative to a vehicle component. For example, using the datum points 932 of the center module, by which the assembly was picked up, the assembly can be set at its intended position relative to a fender of the vehicle. That is, when the assembly is correctly set in at least the x-direction by way of the flange of the center module, then the significant attachment points (here, the headlamp attachment) are also correctly x-positioned as a result. This correlation follows from the spatial relationship between these components that was defined using the fixture.

While another component (e.g., the fender) can be used as a reference point for setting the center module in the x- and/or y-direction, the center module and the respective side brackets will all rest on the bumper beam attachments. These have already been attached to the frame rail in a precise position. For example, the bumper beam attachment can be set in the z-direction relative to a specified position on the vehicle body. That is, the bumper beam attachment (and therefore the bumper beam itself) is therefore correctly positioned in the up/down direction. Moreover, because the bumper beam attachments will carry the integrated vehicle end structure, the entire vehicle end will have the common z position. Stated somewhat differently, during the assembly process the entire vehicle end structure can effectively be floated fore/aft or left/right or both to ensure the best fit. The modular structure also has advantages for future repairs, because instead of having to strip down the whole end of the car, one can simply replace any of the trunk, center module, or the side brackets as needed.

At 918, the headlamps are mounted on the side members. For example, this is done using the attachment points on the side brackets that were precisely datumed based on the x-position of the center module.

At 920, one or more other components are mounted on the vehicle. In some implementations the component(s) can be mounted on some part of the integrated vehicle end structure. For example, fascia can be attached to the center module and/or to the side brackets. This allows the fascia to share the same x- and/or y-position as the center module and the other components of the integrated vehicle end.

At 922, the trunk is inserted in the position defined by the center module and the side brackets. In a sense, the trunk is the piece that ties together all parts of the vehicle end structure. In some implementations, the trunk assembly takes place toward the end of the assembly line, significantly later than when the front end module (e.g., the center module 102 and the side brackets 104A-B) were installed. For example, this provides access to areas underneath the trunk space during the manufacturing process. The trunk and the center module are attached to each other at 924. For example, this can allow the flange of the center module to correctly position the trunk in the x- and/or y-direction.

Other components are mounted to the trunk at 926. For example, the trunk module can serve as the attachment structure for an underhood apron system.

The operations exemplified above can be performed as part of a standard manufacturing process for each individual vehicle. Some implementations described herein, moreover, provide useful flexibility when it comes to updating the manufacturing process itself. Such actions are here exemplified in operations 928 and 930, which are enclosed by a dashed line to indicate this distinction. At 928, it is schematically indicated that the height of the bumper beam can be changed. Because the entire vehicle end assembly sits on the bumper beam attachments, its height (here the z-position) can be adjust by changing the height of these attachments. In particular, the fit of fascia can be affected by raising or lowering the bumper beam attachment. In a sense, the integrated vehicle end structure and its being mounted onto the bumper beam attachments can be said to create a z-plane in which to flexibly set important vehicle components to their proper position. That is, if one finds that the vehicle is building with a slight gap in a particular place, the whole assembly can be brought up or down, of fore/aft, or the individual headlamp brackets can be shifted independently.

As another example, one may find that one side of a type of vehicle is building somewhat longer or shorter than the other side. This can be compensated for by collecting data about the variation and applying that in a "mean shift" adjustment of the fixture. Subsequent vehicles will then be built with the relevant components in a modified position relative to each other. This is schematically indicated at 930.

Two or more of the operations of the method 900 can occur in a different order. As another example, more or fewer operations can be performed.

A number of implementations have been described as examples. Nevertheless, other implementations are covered by the following claims.

What is claimed is:

1. An integrated end structure for a vehicle, the integrated end structure comprising:
    a storage compartment module that comprises a shell forming a storage compartment therein, the storage compartment module configured to sit onto a frame rail of the vehicle; and
    a vehicle end module configured to be mounted onto a bracket in the vehicle that provides adjustability of the vehicle end module in at least a z-direction, the vehicle end module configured for holding a light unit of the vehicle;
    wherein the storage compartment module is mounted onto the vehicle end module.

2. The integrated end structure of claim 1, wherein the integrated end structure is an integrated front end structure, and wherein the light unit is a front headlamp.

3. The integrated end structure of claim 1, wherein the vehicle end module comprises a left headlamp bracket mounted on one side of a center module, and a right headlamp bracket mounted on an opposite side of the center module.

4. The integrated end structure of claim 1, wherein the vehicle end module further comprises an attachment for a hood latch of the vehicle.

5. The integrated end structure of claim 1, wherein the storage compartment module and the vehicle end module are made from at least two different composites.

6. The integrated end structure of claim 1, wherein the vehicle end module is at least partly hollow and the storage compartment extends into the vehicle end module.

7. The integrated end structure of claim 1, wherein the bracket is part of a bumper beam attachment in the vehicle.

8. An integrated end structure for a vehicle, the integrated end structure comprising:
- a storage compartment module that comprises a shell forming a storage compartment therein, the storage compartment module configured to sit onto a frame rail of the vehicle; and
- means for i) taking load carrying capability from the storage compartment module, ii) holding a light unit of the vehicle, and iii) setting at least an x-direction position of the integrated end structure, the means configured to be mounted onto a bracket in the vehicle that provides adjustability of the means in at least a z-direction; wherein the storage compartment module is mounted onto the means.

* * * * *